(12) United States Patent
Wilson-Jones et al.

(10) Patent No.: US 6,597,141 B1
(45) Date of Patent: Jul. 22, 2003

(54) POSITION SENSING IN BRUSHLESS MOTOR SYSTEMS

(75) Inventors: Russell Wilson-Jones, Warwickshire (GB); Anthony Walter Burton, Birmingham (GB); Andrew James Stephen Williams, West Midlands (GB); John Michael Ironside, Birmingham (GB)

(73) Assignee: TRW LucasVarity Electric Steering Ltd., West Midlands (GB)

( * ) Notice: Subject to any disclaimer, the term of this patent is extended or adjusted under 35 U.S.C. 154(b) by 0 days.

(21) Appl. No.: 09/485,332

(22) PCT Filed: Aug. 4, 1998

(86) PCT No.: PCT/GB98/02338

§ 371 (c)(1),
(2), (4) Date: May 1, 2000

(87) PCT Pub. No.: WO99/08374

PCT Pub. Date: Feb. 18, 1999

(30) Foreign Application Priority Data

Aug. 7, 1997 (GB) .............................................. 9716658

(51) Int. Cl.[7] .............................................. G05B 11/01
(52) U.S. Cl. ............................. 318/560; 417/17; 417/42
(58) Field of Search .............................. 318/30–89, 571, 318/802, 561, 460–468, 440–448, 630, 560; 417/17, 42, 443; 701/41; 180/65.6, 65.7, 65.8, 170, 400

(56) References Cited

U.S. PATENT DOCUMENTS

| | | | | |
|---|---|---|---|---|
| 3,668,377 A | * | 6/1972 | Inaba et al. | |
| 3,992,961 A | * | 11/1976 | Saito | |
| 4,713,596 A | * | 12/1987 | Bose | |
| 5,327,790 A | * | 7/1994 | Levin et al. | |
| 5,348,448 A | * | 9/1994 | Ikemoto et al. | |
| 5,361,024 A | * | 11/1994 | Wisner et al. | |
| 5,393,201 A | * | 2/1995 | Okutani et al. | |
| 5,473,237 A | * | 12/1995 | Steinich et al. | |
| 5,602,681 A | * | 2/1997 | Nakayama et al. | |
| 6,104,152 A | * | 8/2000 | Coles et al. | |
| 6,124,688 A | * | 9/2000 | Coles et al. | |
| 6,175,793 B1 | * | 1/2001 | Ironside | |
| 6,246,232 B1 | * | 6/2001 | Okumura | |

FOREIGN PATENT DOCUMENTS

| | | |
|---|---|---|
| JP | 60055880 | 4/1985 |
| WO | WO9725767 | 7/1997 |

* cited by examiner

*Primary Examiner*—Marlon T. Fletcher
(74) *Attorney, Agent, or Firm*—Tarolli, Sundheim, Covell & Tummino L.L.P.

(57) ABSTRACT

A method of calculating the position of the rotor of a motor (1) in for example an electrical power assisted steering assembly is disclosed. The method comprises the steps of measuring the output shaft (2) (i.e. steering column) position, and scaling the measured value to produce an estimated motor rotor position value. This estimated value will be relative to an arbitrary datum point, and so the method further includes steps of adding an offset value derived from low resolution measurements of rotor position obtained using Hall effect sensors provided on the motor. Offsets for compensating for backlash and (in a second embodiment) compliance can also be included. Thus, the method allows high resolution information from an output shaft sensor (e.g. a torque sensor with a position dependent output) to be combined with the low resolution output from the Hall effect sensors to produce a high resolution rotor position signal. A correction is also made to allow for "staleness" in the Hall effect sensor output when calculating the offsets by monitoring rotor speed.

13 Claims, 5 Drawing Sheets

| HALL_C | HALL_B | HALL_A | motor commutation state | commutation centre position | rotor position range | |
|---|---|---|---|---|---|---|
| 0 | 1 | 1 | 3 | 0° | 330° | 30° |
| 0 | 0 | 1 | 1 | 60° | 30° | 90° |
| 1 | 0 | 1 | 5 | 120° | 90° | 150° |
| 1 | 0 | 0 | 4 | 180° | 150° | 210° |
| 1 | 1 | 0 | 6 | 240° | 210° | 270° |
| 0 | 1 | 0 | 2 | 300 | 270 | 330 |
| 0 | 0 | 0 | 0 (Invalid) | — | | |
| 1 | 1 | 1 | 7 (Invalid) | — | | |

*Fig. 2*

POSITION SENSING IN BRUSHLESS MOTOR SYSTEMS

This invention relates to improvements in electric motors, and especially to an improved method of determining the angular or electrical position of a rotor of a motor.

A brushless permanent magnet motor comprises a rotor supporting a plurality of magnetic elements adapted to rotate concentrically within a stator comprising a plurality of coil windings. The motor can be driven by energising one of the coils to attract the rotor magnets whilst energising another of the coils to repel the magnets. To cause the motor to rotate continuously, the currents flowing through the coils must be switched with rotor position. This switching is known as commutation.

To control the commutation of the motor currents, the position of the rotor must be determined, and it is well known to provide magnetic sensors such as Hall effect sensors to detect the passing of the rotor magnets. In one known arrangement, three Hall effect sensors are located around an inner periphery of the stator and produce a 3-bit digital code representative of electrical position of the rotor. Whilst this is adequate for control of commutation which occurs at precise predetermined locations dependent upon motor geometry, the output of the sensors is relatively crude and low in resolution.

An arrangement of the kind hereinbefore described is known from our published International patent application WO 97/25767A which is considered to represent the closest prior art to the present invention.

In accordance with a first aspect of the invention, a method of calculating the position at a moment in time of a rotor in a motor which is connected to an output shaft through an intermediate means comprises the steps of:

obtaining a measured rotor position first value indicative of the angular position of the rotor at a first instance in time using a first sensing means provided at the motor;

measuring an output shaft position second value indicative of the angular position of the output shaft at a second instance in time using a second sensing means provided on the output shaft;

combining said first and second values to produce an estimate of the angular position of the rotor at said moment in time; and further comprising the steps of calculating a backlash value indicative of a backlash between the rotor and the output shaft.

Thus, in accordance with the invention, an improved measurement of rotor position can be obtained by employing information from a sensing means provided on the output shaft.

In many systems, a suitable sensing means may already be provided on the output shaft, and so employing information from this sensing means allows an improved method of calculating high resolution position information without the expense and bulk of adding additional high resolution sensors at the motor.

The first sensing means may comprise a plurality of magnetic Hall effect sensors adapted to produce an output signal indicative of the angular position of the rotor. The measurement of motor electrical position used by the method may thus be provided by sampling this output signal. Preferably, the method may comprise the further step of storing the output value from the Hall effect sensors and updating the stored value whenever the output from the Hall effect sensors changes.

In one proposed embodiment, the method may be adapted for use with a motor in an electric power assisted steering system which provides a steering assistance torque, to an output shaft. A separate or combined torque and/or a position sensor are typically provided on the output shaft in this system in order to evaluate the degree of assistance to be provided by the motor, and this torque and position sensor can be used to provide the measurement of the angular position of the output shaft, i.e. used as the second sensing means in the method of the invention.

It may be desirable to provide a gearbox between the motor rotor and the output shaft, and a clutch to allow disengagement of the motor from the output shaft. Thus, the intermediate means may comprise at least a gearbox and/or a clutch.

Where the intermediate means comprises a gearbox, the method may comprise the further step of multiplying the measured output shaft position value from the second sensing means on the output shaft by the gearbox ratio to produce a scaled output shaft position value. For example if the ratio of the gearbox is such that the motor rotates one turn for two turns of the output shaft, the output from the position sensor on the output shaft should be halved to produce the scaled output shaft position value.

The scaled value may also be multiplied by one half the number of rotor poles. Thus, the output of the position sensor can be scaled to correspond with the motor electrical position instead of mechanical position.

This is advantageous in that it enables the output shaft position value to be mapped onto the rotor position.

The method may comprise the further step of calculating an offset value indicative of any angular offset present between the rotor position given by the scaled output shaft position value and the actual rotor position.

The method may further comprise the steps of updating the offset value in response to the output of the rotor position sensor. For example, if the measured rotor position value is obtained using (a) Hall effect sensor(s) at the motor (which may also control(s) commutation timing), a high accuracy measurement of rotor position is available at the instant of change of state of the Hall sensor output which can be combined with the scaled output shaft position value to update the value of the offset.

The value of the offset may be updated instantaneously upon a change in state of the Hall effect sensors. This may correspond to a commutation event occurring in a simple control method. Alternatively, it may be updated at some later time when the next reading from the output shaft sensor is obtained, i.e. at the next update of the scaled output shaft position value. In this case, the measured rotor position can be updated by the addition of an amount dependent upon the product of the speed of the rotor and the time between the change in Hall effect sensor output event and the next update of the scaled output shaft position value. This allows the method to take into account movement of the rotor during this time interval. A motor rotor speed sensor may be provided. Most preferably, the rotor speed could be calculated from a speed sensor on the output shaft combined with a knowledge of gearbox ratio. The speed sensor may form part of a combined speed/torque/position sensor.

The method may further comprise estimating a separate offset value for each direction of rotation of the rotor. This is advantageous in that it allows the effect of differing properties of the system in different rotational directions to be taken into account.

When a clutch is provided as a part of the intermediate means, the relationship between scaled output shaft position value and rotor position value can not be determined whilst the clutch is disengaged. In this state, the method is invalid and so a further step of determining the state of the clutch can be included. When the clutch is disengaged, a 'method valid' flag can be lowered so that the results of the method are ignored. Similarly, the 'method valid' flag can be raised when the clutch is engaged.

The offset may be further refined by incorporating an adjustment value dependent on the backlash present between the rotor and the output shaft. The backlash adjustment value can be estimated from the difference between the offset values for each direction of rotation. The offset may be further refined by incorporating an adjustment value dependent on the compliance of the gearset between the rotor and the output shaft. The compliance may be estimated, and may be a fixed pre-set value.

Additionally, that part of the offset due to torsion in the intermediate means due to motor output torque may be subtracted.

In order to estimate the backlash from the offset values, a filter can be employed to obtain the estimated backlash values. As the backlash value would not be expected to change rapidly, the filter may only be updated when either of the offset values for the forward or reverse direction have been updated.

The backlash value may be averaged over time to produce a backlash value which varies over time at a slower rate than the pre-averaged backlash value. This averaged value may then be used in all calculations. The averaging may be performed by passing the backlash value through a recursive filter.

At each initialisation of the system, the previously calculated value of backlash may be re-used. Thus, the method may comprise a further step of storing the backlash estimates when the system is powered down, for example by writing the value of the backlash estimate(s)-into non-volatile memory on power down and reading the value(s) on power up.

In accordance with a second aspect, we provide an electrical power assisted steering system comprising:
  an electric motor comprising at least a stator and a rotor, an output shaft connected to the rotor through an intermediate means,
  a first sensing means at the motor adapted to produce an output indicative of the position of the rotor,
  a second sensing means at the output shaft adapted to provide at least an output indicative of the position of the output shaft, and
  an electronic processing means adapted to receive the first and second output signals and produce an estimate of the position of the rotor in accordance with the method of the first aspect of the invention.

Preferably, the electronic processing means is further adapted to control the operation of the electric motor based upon the estimated position of the rotor.

The first sensing means may comprise a plurality of Hall effect sensors adapted to detect the passing of magnets on the motor rotor. The second sensing means may comprise a dedicated angular position sensor or a combined torque sensor and angular position sensor.

The system may further comprise a pulse generating means adapted to produce a clock signal. The electronic processing means may be adapted to sample the output of the second sensing means upon each clock signal.

The system may also include a clutch between the rotor and the gearbox, or the gearbox and the output shaft. A clutch status determining means may be provided to produce a "method valid" signal when the clutch is engaged.

It will be understood that the present invention enables a high resolution measurement of motor rotor position to be obtained by combining information from a sensor provided on an output shaft with information having low resolution but high accuracy from a sensor provided at the motor rotor. Specifically, the low resolution information can be employed to update an offset value which enables positional information obtained from the output shaft sensor to be correlated to the rotor position where an arbitrary relationship between the angular position of the output shaft and motor rotor exists. This is especially advantageous in a system in which a clutch is provided as a part of the intermediate means, and/or a system in which the output shaft position is measured with respect to an arbitrarily determined datum.

There will now be described, by way of example only, one embodiment of the present invention with reference to the accompanying drawings in which:

FIG. 2 is a table illustrating the motor rotor position corresponding to the commutator state codes generated by the Hall effect sensors;

Figure 1:
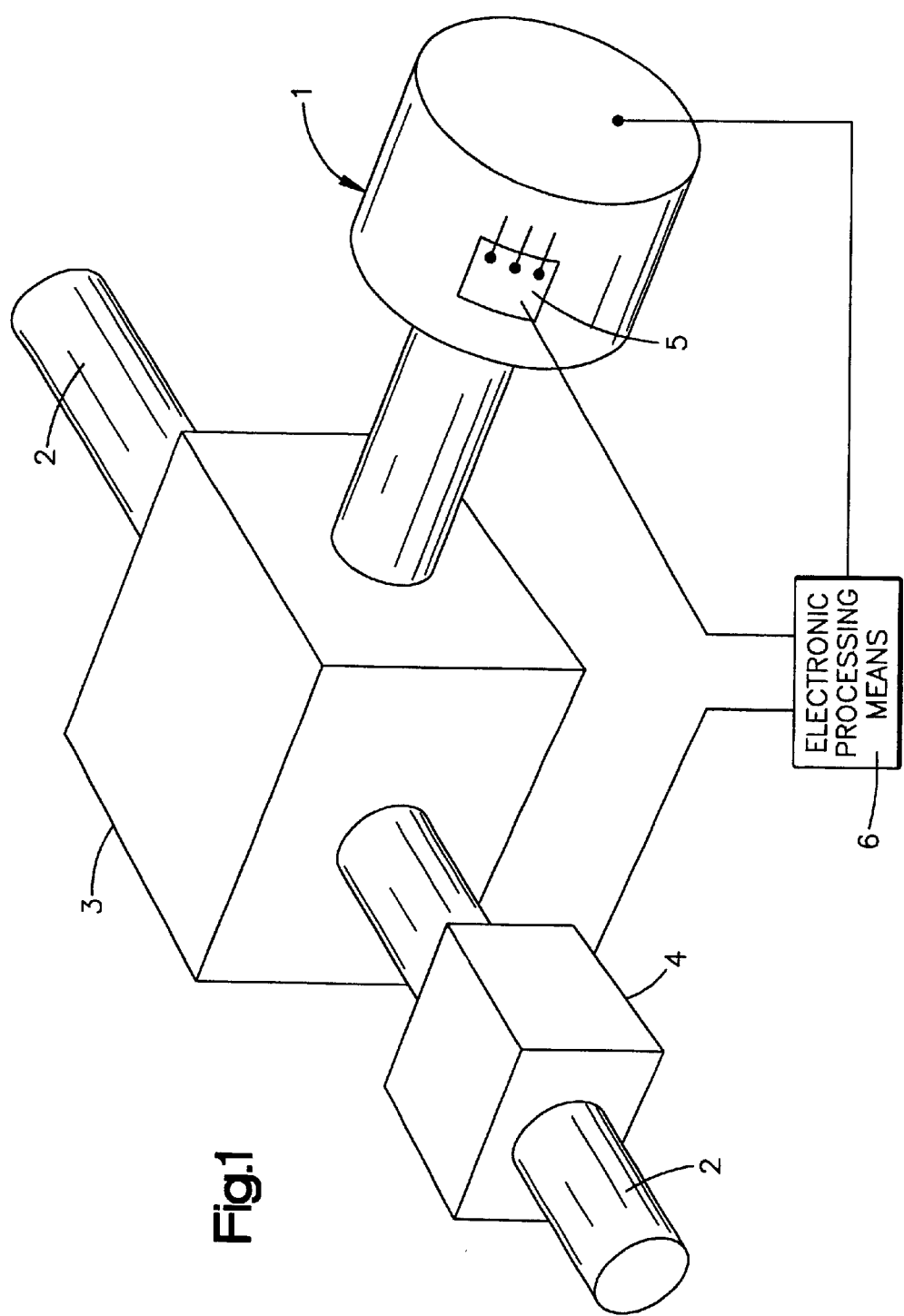
FIG. 1 is an illustration of a system comprising an electric motor connected to an output shaft via an intermediate means.

A system in accordance with the invention suitable for use with the method of the invention is illustrated in FIG. 1 of the accompanying drawings.

Figure 3:
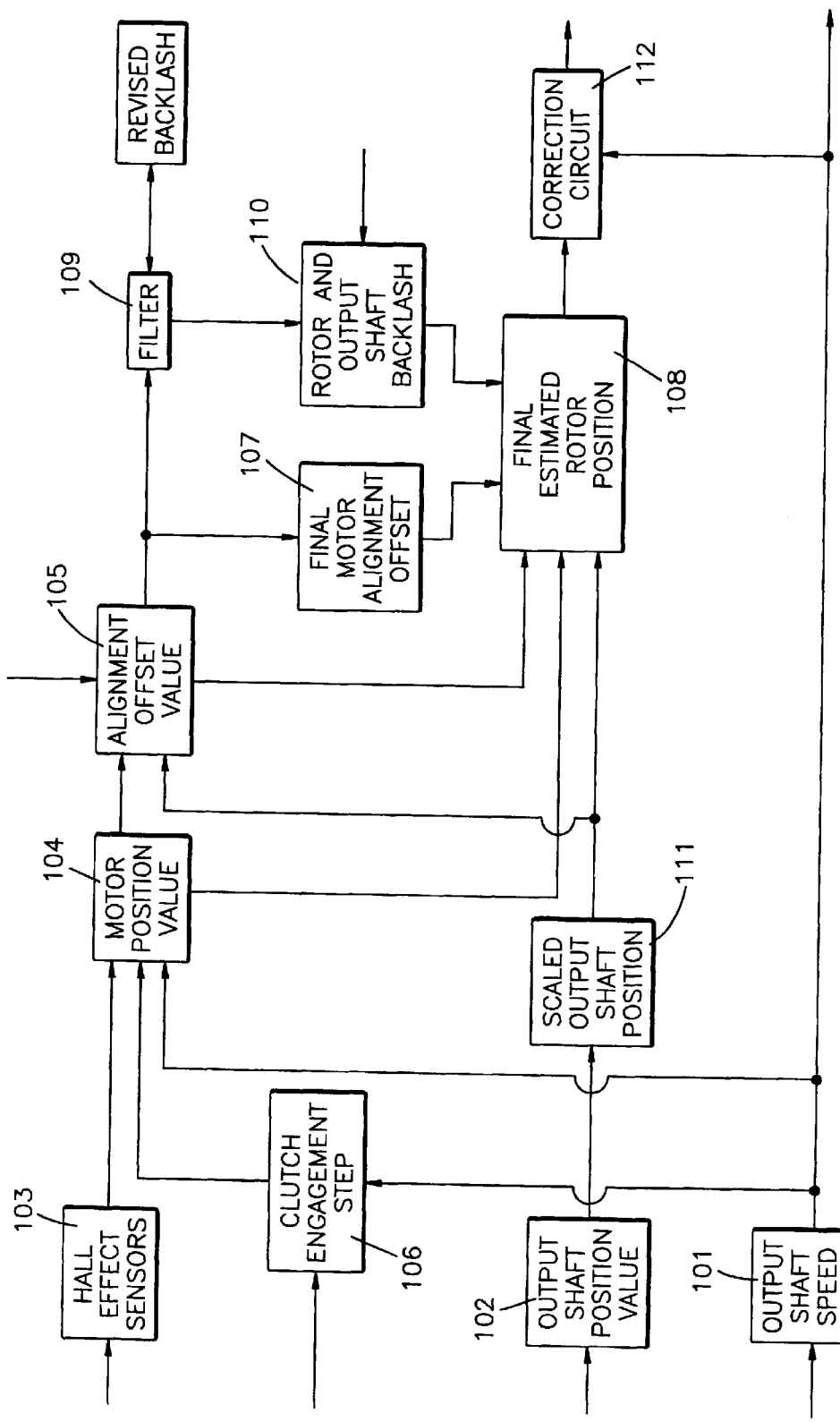
FIG. 3 is a flow diagram for a software routine embodying the method of the present invention.

A method in accordance with the invention is embodied in the form of a software algorithm, as shown in the block diagram of FIG. 3. In the method, the torque sensor provides continuously sampled information 103 from Hall effect sensors which is used to ensure correlation between an output shaft angular position and the angular position of a rotor.

The system comprises an electric motor 1 connected to an output shaft 2 via a gearbox 3. The output shaft 2 carries a torque sensor 4 which is adapted to provide output signals: a torque value, an output speed value 101 and a "measured output shaft position value" 102 representative of the torque, speed and angular position of the output shaft respectively. The electric motor is provided with three serially arranged Hall effect sensors 5 which provide an output 103 in the form of a three-bit digital code. Each combination of digits defines a range of positions for the motor rotor, with the digits changing from one combination to another at predetermined rotor positions as the rotor magnets pass the Hall sensors. These change points may correspond to a commutation point. For three sensors, each digit combination corresponds to a range of rotor positions of 60° as six different codes are possible. This is shown in FIG. 2.

The Hall sensors only provide accurate position information at the instant at which the Hall sensor output code changes. At all other rotor positions the Hall sensors can only state whether the rotor is within a particular 60 degree electrical range (for 3 sensors). The motor position value produced by the Hall effect sensors is stored 104 as a "measured absolute position value". To improve on this resolution, the method of the present invention employs output shaft position information from the torque sensor 4.

The presence of the gearbox 3 between the rotor and the output shaft 2 means that in order to calculate the angular position of the motor from a measurement of the output shaft position, the "measured output shaft position value" must first be multiplied by the gearbox ratio to produce a scaled output shaft position value which maps correctly onto the rotor shaft position. This is calculated 111 as follows:

scaled output shaft position value=(measured output shaft position value×motor output shaft ratio) mod 360° where motor output shaft ratio=gearbox ratio×half number of rotor poles.

The inclusion of "mod 360" indicates the use of modulo −360° arithmetic. For example, under this arithmetic, −10°→350°, 380°→20°, 360°→0° etc.

The inclusion of "half number of rotor poles" converts the position value into electrical motor position rather than mechanical angular position.

The above equations map the position information from the output shaft onto the rotor taking into account the gearbox ratios. However; they do not take into account any offset present. In a practical system of the kind shown in FIG. 1, there is an arbitrary relationship between the" "scaled output shaft position value" (in the range 0–360°) and the position of the rotor (in the range of 0–360°). Thus, in order to utilise information regarding the position of the output shaft to determine the position of the rotor, the offset between the rotor and the output shaft must be known. In order to eliminate the effect of the offset, the following calculation 105 is used:

alignment offset value=measured absolute motor position value− scaled output shaft position value.

The value of "measured absolute motor position value" is obtained from the Hall effect sensors output codes and will change as the motor rotates. Only the value at the instant of a change in output code is of high accuracy. The above equation therefore generates an offset value which is representative of the angular offset between the actual motor rotor position value and the scaled output shaft position value. The equation is only valid if the measured absolute motor position value and the scaled output shaft value are obtained at the same instant. In practice, however, this may not be possible. In the embodiment described herein, the output shaft position value from the torque sensor is measured at regular time intervals using a clock signal to trigger a sample of the value. However, a change in Hall sensor code only occurs at indeterminate times and will probably not coincide exactly with a clock pulse. To get round this problem, the measured absolute motor position value is corrected using the following equation:

corrected absolute motor=measured absolute motor position value position value+(motor velocity×time since last change in value of measured absolute motor position value).

The "corrected absolute motor position value" can then be substituted for the measured value in calculating the alignment offset value. This ensures that the distance travelled by the motor during the time interval between a commutation event and the update of the offset is taken into consideration, and eliminates the need to obtain simultaneous measurements of output position when a commutation event occurs. In a system where the output shaft position value is measured on each clock pulse, this interval will correspond to the time from a commutation event to the next clock pulse.

In addition to the above method steps which enable the offset to be calculated and updated, an alignment offset is required for each motor direction. Thus, the software calculates alignment offset values in each motor direction (forward and reverse) and stores two separate values. These two offsets are filtered to prevent sudden changes to the motor position. The filters may be simple slew rate limits or recursive filters, and the following software algorithm 105 is used:

IF (motor current>0) THEN filtered forward alignment offset= FILTER (alignment offset value)

ELSE IF (motor current<0) THEN filtered reverse alignment offset=FILTER (alignment offset value)

The resolution of the two filtered offset values should ideally be better than that of the unfiltered offset value.

Having obtained the forward and backward alignment offset values, the final motor alignment offset is calculated 107 as follows:

final motor alignment offset value=(filtered forward offset value+ filtered reverse offset value)÷2

In addition to providing an updated value of alignment offset using Hall sensor information in combination with the output shaft position information, the two filtered offset values are used to calculate 110 a measure of the backlash present between the rotor and the output shaft as follows:

Estimated gearbox backlash magnitude=FILTER (filtered forward alignment offset−filtered reverse alignment offset)÷2

Again, a filter 109 is employed to ensure the backlash estimate does not change rapidly, and in practice only a gradual change in the backlash magnitude should occur.

Figure 4:
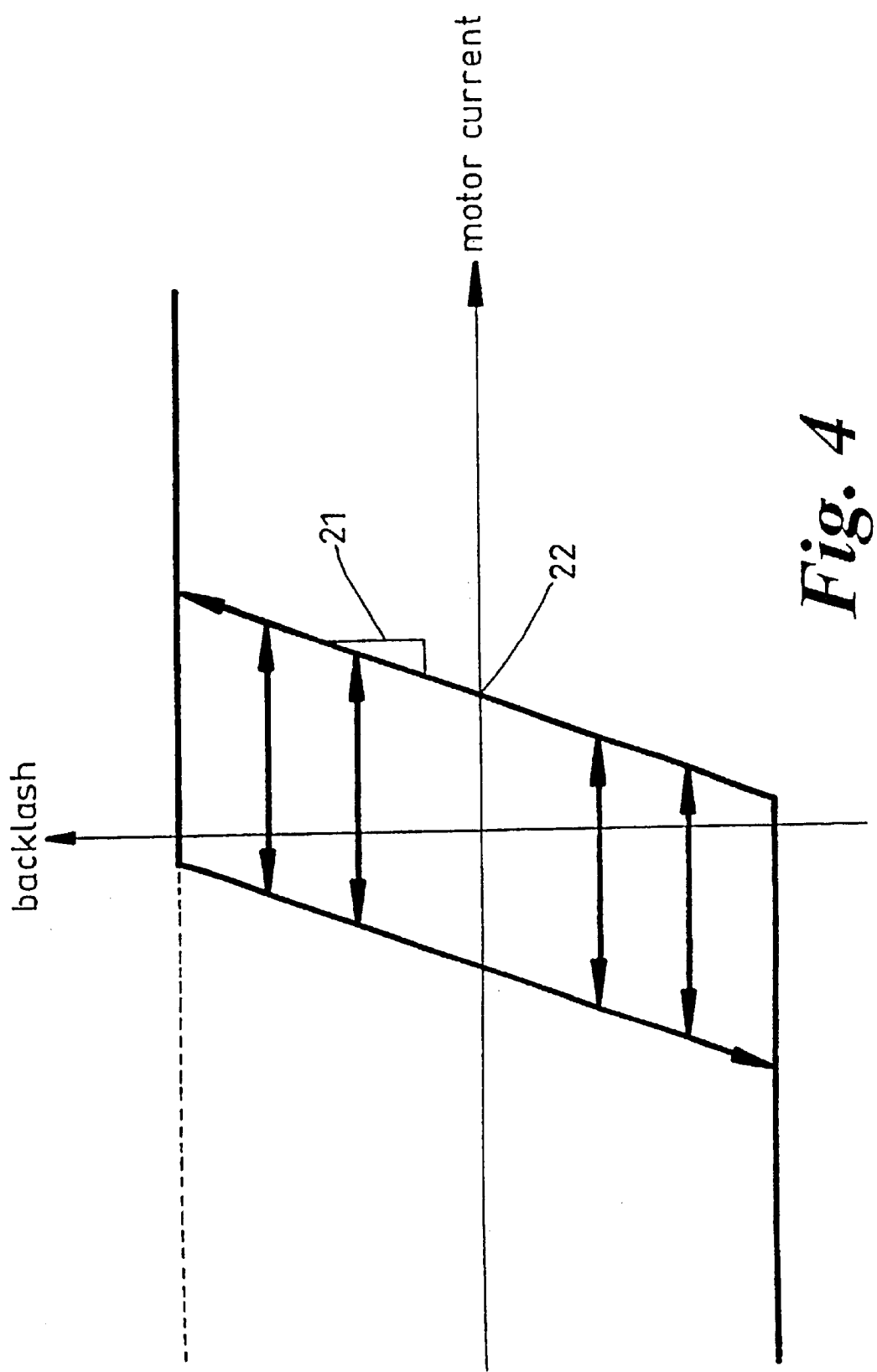
FIG. 4 illustrates the effect of backlash between the rotor and the output shaft plotted as backlash against motor current.

The backlash correction factor is dependent upon the motor current, i.e. upon the motor output torque. The characteristic will always be symmetrical about zero current and can be defined by a hysteresis gain value and a half width value. FIG. 4 is a plot of backlash against motor current with the gain 21 and half width 22 marked on.

Having calculated the scaled output shaft position value, the final motor offset value and the backlash correction value, the final estimated rotor position is calculated 108 using the expression:

Final estimated rotor position value=(scaled output shaft position value+motor offset+backlash value) mod 360°.

This value is valid provided that the motor rotor and output shaft are engaged. However, where a disengaged clutch is provided between motor and output shaft, the expression will be invalid. To overcome this possible problem, the software algorithm includes a step 106 of checking clutch engagement, and it is notified that the clutch is disengaged, a "method valid" flag is lowered to warn that the equation is invalid. In that event, motor position can be easily estimated from the expression:

final estimated rotor position value=commutation centre position value (as shown in FIG. 2)

The values of final estimated rotor position and motor rotor speed can be used as control inputs for driving the electric motor. When the "method valid" flag is lowered, motor control is in accordance with a 'standard', commutated DC control. When the more accurate information from the output shaft sensor can be used, a more refined motor control algorithm can be used. For example, small variations in commutation point about the nominal commutation point can be effected.

Figure 5:
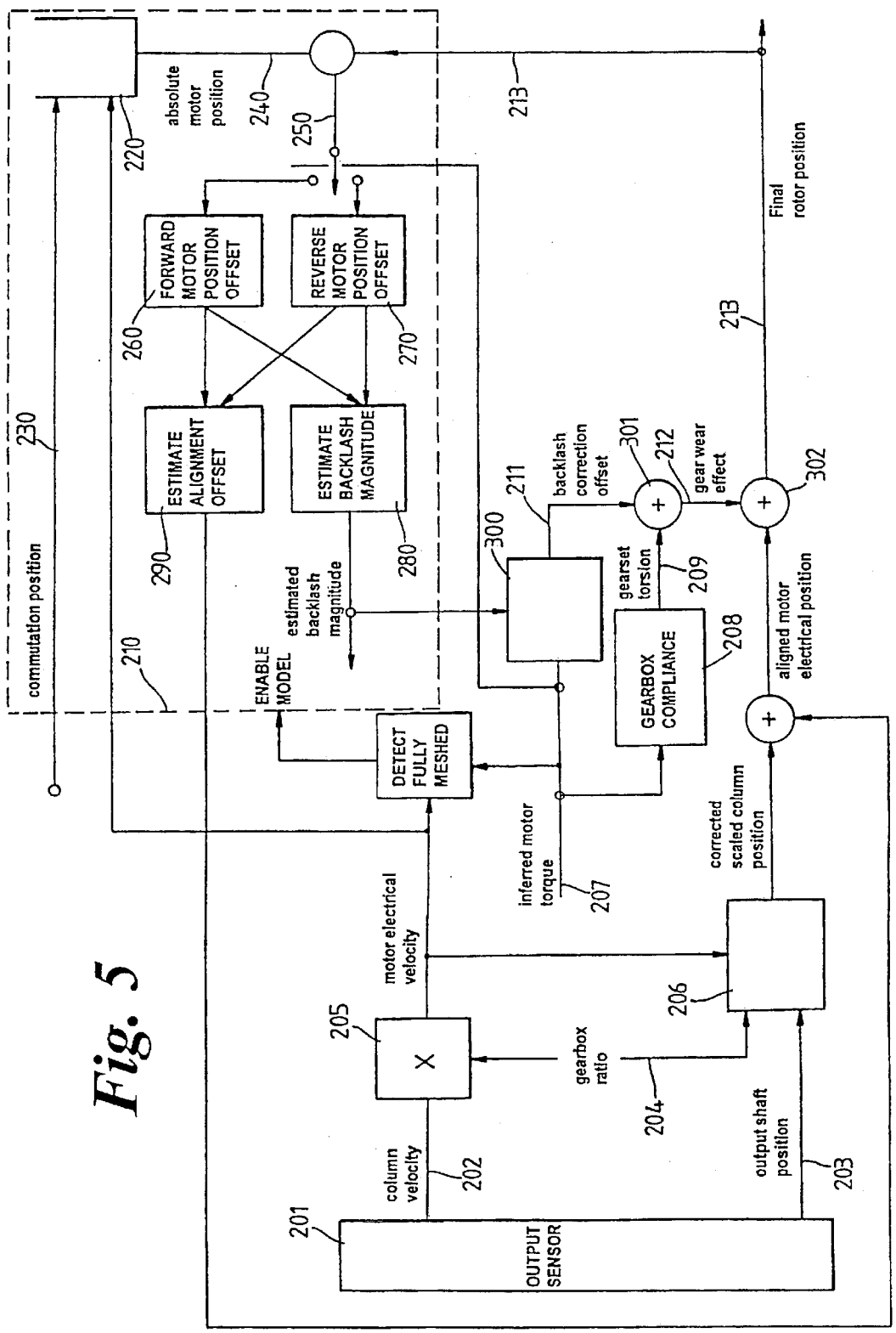
FIG. 5 is a flow diagram of an alternate embodiment of a software routine for calculating motor rotor position.

A second control strategy is shown schematically in FIG. 5.

In this embodiment, an output shaft velocity measurement is made which is initially rescaled by a known constant factor into motor electrical velocity units. An output shaft position measurement is similarly rescaled into motor electrical position units and extrapolated forward to the present time, using the motor velocity signal, so as to compensate for any staleness in the original measurement. An estimated alignment offset is added to re-reference the scaled output shaft position value with respect to the motor rotor. A combined gearset compensation signal is then added to compensate for any backlash and compliance.

The gearset compensation signal is made of two components: gearset torsion (i.e compliance) and backlash correction offset. Some gearsets have been found to have backlash that increases very slowly as the gearteeth wear, but to have compliance that hardly varies at all over the life of an EPAS system. A prescribed gearset compliance is therefore multiplied by motor torque (which may be inferred from measurements of the motor current) to yield gearset torsion. The backlash correction offset depends on the motor torque and an estimate of the backlash magnitude derived in software to be described below.

The resulting motor electrical position signal can be used as a motor control feedback signal and allows a better quality of control to be established.

The motor electrical velocity and the motor torque can be employed to decide whether to update the gearset parameter estimates. The model is updated whenever the motor torque is consistent with the gearset being meshed and the motor speed is neither too fast nor too slow for accurate measurement.

When these conditions are met the signals from the motor rotor position sensors (usually binary state Hall effect probes) are first decoded and then corrected for measurement staleness. The difference between the motor electrical position signal and the corrected rotor position measurements is the error in the "motor offset" model. The model has two output parameters, the "estimated alignment offset" and the "estimated backlash magnitude". They are adjusted so as to keep the average motor offset model error close to zero.

The estimated backlash magnitude is derived by low pass filtering the difference between two position offsets, the forward and the reverse. The forward offset is adjusted to keep the average motor offset model error close to zero when the motor torque is positive and the reverse when it is negative. The two offsets are thus adjusted to account for the average column/motor discrepancy when either one face of the gearset is in mesh, or the other. The difference between the two offsets may increase slightly over the life of the system as the faces of the gearset wear. The backlash magnitude parameter may be compared with a threshold value so as to indicate unacceptable wear as in the first embodiment. Since the backlash magnitude will vary only very slowly it may be stored in non-volatile memory (NVM) at the end of each period of operation. The low-pass filter can be re-initialised to the NVM value when operation re-starts, for example in an electric power steering system this may be at the start of each journey.

The estimated alignment offset may be calculated from slew-rate limiting the mid-point of the two position offsets. Since the column position is usually referenced to an entirely arbitrary datum (such as the power-up value) the mid-point of the two position offsets is also entirely arbitrary at start-up and no benefit arises from storing an averaged value in NVM. Instead the slew rate filter can be re-started from the first position offset measurement.

The control strategy is described in more detail in the following description which outlines the various steps embodied in the schematic of FIG. 5.

Firstly the control strategy calculates or obtains values of output shaft velocity 202 and absolute output shaft position 203 using a column sensor (i.e. a combined torque and position sensor) 201.

Next, using a preset value of gearbox ratio 204 as for the first embodiment, the values 202, 203 are multiplied by the gearbox ratio to produce a motor electrical velocity value 205 and a corrected scaled output shaft position value 206 according to:

corrected scaled output shaft position value=[(measured output shaft position value×motor box output shaft ratio)+(motor velocity×time since last measurement of absolute output shaft position value)]mod 360°

Motor electrical velocity=(measured output shaft velocity×motor output shaft ratio)

The corrected scaled output shaft position value this incorporates a correction for movement of the rotor between changes in the value of output shaft position. This is different from the first embodiment where no such correction was performed. Of course, the first embodiment could be modified to make such a correction.

From the value of corrected scaled output shaft position, an "aligned motor electrical position" value can be calculated as follows:

aligned motor electrical position=MOD 360 (corrected scaled output shaft position+estimated alignment offset)

The "estimated alignment offset" is an output value representing the error due to differences between the datum points about which the measurements of output shaft position and motor rotor position are made, and is calculated in a manner described herein after. The aligned motor electrical position thus compensates for the effects of such datum misalignment As stated previously, compensation for the effect of the gearset is required. This error component is made up from two components: effect of compliance and effect of backlash. Some practical gearsets have been found to have backlash that increases very slowly as the gearset teeth wear, but to have compliance that hardly varies at all over the life of the system. Accordingly, it is possible to use a prescribed value of gearset compliance 208 (for example stored in a non-volatile memory) which can be multiplied by a value of the motor torque 207 to yield a gearset torsion value 209 such that:

gearset torsion=gearbox compliance×motor torque.

The motor torque value may be measured or inferred.

Whilst a predetermined value of compliance can be used successfully, a calculated value of backlash is desirable to take into account changes due to wear of the teeth.

The method of FIG. 5 incorporates a backlash correction algorithm which generates a "backlash correction offset value" 211 that is dependent on the motor torque using a gearset model 210.

The characteristics of the plot of backlash against motor current will always be symmetrical about zero and shall be defined by the BACKLASH CORRECTION HYSTERESIS GAIN and the BACKLASH CORRECTION HALF WIDTH, as shown in FIG. 4.

The value of backlash correction offset 211 may be bounded so that its magnitude does not exceed the estimated backlash magnitude÷2. These calculations are made at every iteration, as follows:

> IF BACKLASH CORRECTION HYSTERESIS GAIN*(motor torque-BACKLASH CORRECTION HYSTERESIS HALF WIDTH)>old backlash correction offset
>
> THEN backlash correction offset=BACKLASH CORRECTION HYSTERESIS GAIN*(motor torque-BACKLASH CORRECTION HYSTERESIS HALF WIDTH)
>
> ELSE IF BACKLASH CORRECTION HYSTERESIS GAIN*(motor torque+BACKLASH CORRECTION HYSTERESIS HALF WIDTH)<old backlash correction offset
>
> THEN backlash correction offset=BACKLASH CORRECTION HYSTERESIS GAIN*(motor torque+BACKLASH CORRECTION HYSTERESIS HALF WIDTH)

ELSE

> backlash correction offset=old backlash correction offset

END

> backlash correction offset=MIN(MAX(backlash correction offset,-estimated backlash magnitude/2),+estimated backlash magnitude/2)
>
> old backlash correction offset=backlash correction offset Where MIN(x,y,z) is the algebraic minimum of x,y,z and MAX(x,y,z) is the algebraic maximum of x,y,z.

The gearset torsion 209 and "backlash correction offset" 211 can then be combined to produce a "gear wear effect value" 212 which may be combined with the value of aligned motor position to produce a "final estimated motor rotor position value" 213 such that:

> Final estimated motor rotor position value=MOD 360 (aligned motor electrical position+combined gear wear effect)

where:

> combined gear-wear effect=backlash correction offset+gearset torsion.

Alternatively, at power up, or perhaps when the above would produce an unreliable result, the following can be used:

> Final estimated motor rotor position =commutation centre position.

An additional function may be provided which is adapted to continuously detect when the gearbox is fully meshed (i.e does not lie in the backlash region). The relationship between the motor position and the column position can then be used to update the motor offset model.

A minimum velocity threshold may also be imposed which is set high enough to avoid updating the absolute motor position and the gearset model from a Hall sensor transition which is "too old".

The gearbox fully meshed flag can be set to indicate that the gearbox is fully meshed whenever the following conditions are all met:

> ABS (motor electrical velocity)>MOTOR MESH MIN VELOCITY THRESHOLD
>
> ABS (motor electrical velocity)<MOTOR MESH MAX VELOCITY THRESHOLD
>
> ABS (motor torque)>MOTOR MESH MIN TORQUE THRESHOLD
>
> SIGN (motor torque)=SIGN (motor electrical velocity)

The flag can be reset if any of the above conditions do not hold.

The method of calculating the estimated alignment offset will now be described.

In a first stage of the gearset model 210, the "motor electrical velocity" 205 is combined 220 with a "measured absolute motor position value" 230 obtained from position sensors in order to produce a corrected absolute motor position value 240 which is compensated for the time elapsed since the measurements were made such that:

> corrected absolute motor position=MOD 360 (measured absolute motor position value+[motor electrical velocity×(time now-time of measurement)])

Thus, where a Hall effect sensor is used to measure absolute motor position, this algorithm compensates for movement of the motor after a change in Hall effect sensor state to increase accuracy.

The value of "corrected absolute motor position" 240 is combined with the value of final estimated motor rotor position 213 to produce a "motor offset model error" value 250 given by:

> motor offset model error=MOD 360 (corrected absolute motor position−Final estimated motor rotor position+180°)−180°

This signed expression is the shortest angular distance from the motor electrical position to the absolute motor position in either direction around the circle and hence constrains the motor offset model error to lie within −180° to +180°). If, during a journey, corrected absolute motor position consistently leads measured motor absolute position by, say, 10° when driving in a positive direction, then this expression will produce a consistent+10° result even when corrected absolute motor position wraps round from 360° to 0° while measured absolute motor electrical position is still climbing from 350° towards 360°. The "motor offset model error" is equally likely to be positive as negative irrespective of the motor drive direction.

Having calculated the "motor offset model error" 250, a motor position offset is calculated for each direction of drive , forward 260 and reverse 270. Each of these "motor position offsets" is individually urged by integral action towards a target value (unknown at the start of a journey) that will yield a low motor offset model error. The generation of these offsets from an error signal with a low average value requires substantial DC gain (e.g. integral action) to reveal the difference in the relative positions of, for example, a worm and (scaled) wormwheel in the gearbox during forward and reverse drive.

One of the two offset values can be updated according to the direction of motor torque:

> IF (motor torque>0) THEN
>
>> forward motor position offset=(forward motor position offset+motor offset model error*motor position offset error gain)
>
> ELSE
>
>> reverse motor position offset=(reverse motor position offset+motor offset model error*motor position offset error gain)
>
> ENDIF The forward and reverse motor position offset values can both be initialised when the first motor offset model error 250 is calculated. A "motor offsets initialised flag" can then be set to indicate that the motor offset model error 250 is now valid. The offset values can be initialised according to the direction of motor torque:

IF (motor torque>0) THEN forward motor position offset=corrected absolute motor position−corrected scaled output shaft position−gearset torsion reverse motor position offset=forward motor position offset−estimated backlash magnitude

ELSE reverse motor position offset=corrected absolute motor position−corrected scaled output shaft position−gearset torsion forward motor position offset=reverse motor position offset+estimated backlash magnitude

ENDIF

The two values (forward and reverse) of motor position offset 260, 270 can then be combined to produce an estimate of the backlash magnitude 280 and an estimate of the alignment offset 290.

The backlash magnitude 280 can be estimated from the difference between these two motor position offsets 260 and 270:

measured backlash magnitude=min (max (forward motor position offset−reverse motor position offset, 0°), MAX ESTIMATED BACKLASH)

estimated backlash magnitude=[measured backlash magnitude+(backlash filter constant−1)*estimated backlash magnitude]/backlash filter constant The estimated backlash magnitude can be restored from non-volatile memory (NVM) at the beginning of each journey and stored back to NVM at power-down. A further filter shall be applied when storing the estimated backlash magnitude to NVM to prevent somewhat erroneous data gathered during a short journey from having a long-term affect on the system performance. This filter shall limit the change to a maximum of ±NVM BACKLASH MAX CHANGE per power cycle.

The backlash magnitude estimate 280 is used to calculate a backlash correction offset value 300 which can be combined 301 with the gearset torsion value 209 to yield the value of combined gear wear effect 212 which is added 302 to the aligned motor electrical position value to yield the "final estimated motor rotor position" value 213 as described herein before.

The backlash correction algorithm therefore generates a position correction component that depends on the motor torque.

At the first ever system power-down during initial EPAS unit testing, the value of estimated backlash magnitude 280 can be stored in NVM without filtering.

Having calculated the forward and reverse offsets, the estimate of the alignment offset 290 can be calculated. The value can be constantly updated towards the mid-point of the two motor position offsets:

measured alignment offset=(reverse motor position offset+forward motor position offset)÷2 alignment offset change=measured alignment offset−estimated alignment offset alignment offset change=min(max(alignment offset change,−ALIGNMENT OFFSET MAX CHANGE),+ALIGNMENT OFFSET MAX CHANGE)

estimated alignment offset=estimated alignment offset+alignment offset change.

On initialisation, the following estimate of alignment offset can be used:

estimated alignment offset=(reverse motor position offset+forward motor position offset)÷2

Thus, it will be readily understood by the man skilled in the art that the second embodiment provides a method of calculating the position of a rotor in a motor at a moment in time taking into account the effects of backlash and compliance. The second embodiment is capable of resetting the backlash estimates employed to compensate for wear of the system over time. It will also be understood that many of the refinements described in relation to the first aspect are applicable to the second aspect. For example, the arrangement and location of sensors may be the same.

It will also be understood that the second embodiment employs the same output measurement signals of motor position, output shaft position and torque acts as the first embodiment−, but provides an improved method of calculating absolute motor position by making assumptions about compliance in the system.

What is claimed is:

1. A method of calculating the position at a moment in time of a rotor in a motor which is connected to an output shaft through an intermediate means for transmitting torque from the rotor to said output shaft, said intermediate means comprising a gear box, said rotor and said output shaft having gears in meshing engagement with each other in said gear box, said gear of said rotor driving said gear of said output shaft to provide torque assistance, said method comprising the steps of:

obtaining a measured rotor position first value indicative of an angular position of said rotor at a first instance in time using a first sensing means provided at said motor;

measuring an output shaft position second value indicative of an angular position of said output shaft at a second instance in time using a second sensing means provided on said output shaft;

combining said first and second values to produce an estimate of the angular position of said rotor at said moment in time; and calculating a backlash value indicative of the backlash in the intermediate means between said rotor and said output shaft and adjusting the estimate of the angular position of said rotor in response to the calculated backlash value.

2. A method according to claim 1 including a further step of multiplying said measured second value by at least a gearing ratio of said gearbox to produce a scaled output shaft position value.

3. A method according to claim 2 including a further step of calculating an offset value indicative of the offset between said actual position of said rotor and said position of said rotor as given by said scaled output shaft position value.

4. A method according to claim 3 wherein said offset value is calculated by comparing said measured rotor position first value with said scaled output shaft position value.

5. A method according to claim 3, comprising calculating a corrected offset value by combining said offset value with an amount equal to the product of said motor rotor velocity and the time between obtaining said measured rotor position first value and said output shaft position second value.

6. A method according to claim 3, in which a forward offset value and a reverse offset value are calculated dependent upon the sense of said motor output torque.

7. A method according to claim 1, wherein said backlash value is averaged over time to produce a backlash value which varies over time at a slower rate than said pre-averaged backlash value.

8. A method according to claim 7, wherein said backlash value is averaged by passing through a recursive filter.

9. A method according to claim 3, including the further step of subtracting that part of the offset which is dependent upon torsion caused by motor output torque in said intermediate means.

10. A method according to claim 9, including the step of combining said offset and backlash values with said scaled rotor position value to produce an estimated rotor position value indicative of the absolute position of said rotor.

11. A method according to claim 3, wherein said offset value is recalculated whenever said measured rotor position first value changes.

12. A method according to claim 1, wherein said measured output shaft position second value is obtained by sampling said output of said second sensing means in response to a clock signal.

13. A method according to claim 1, wherein said measured rotor position first value is obtained by measuring the output of a plurality of Hall effect sensors.

* * * * *